United States Patent [19]

Hanson et al.

[11] Patent Number: 5,740,229
[45] Date of Patent: Apr. 14, 1998

[54] METHOD AND APPARATUS FOR A PRE-PAID RETURN CALL

[75] Inventors: Stephen Emmord Hanson, Edgewood, Md.; Ashok N. Rudrapatna, Basking Ridge, N.J.

[73] Assignee: AT&T Corp, Middletown, N.J.

[21] Appl. No.: 616,413

[22] Filed: Mar. 15, 1996

[51] Int. Cl.[6] .............. H04M 3/48; H04M 3/50; H04M 15/16
[52] U.S. Cl. .............. 379/67; 379/89; 379/112; 379/209
[58] Field of Search .............. 379/209, 115, 379/67, 89, 88, 112, 114, 84

[56] References Cited

U.S. PATENT DOCUMENTS

| | | | |
|---|---|---|---|
| 4,847,890 | 7/1989 | Solomon et al. | 379/67 |
| 4,932,042 | 6/1990 | Baral et al. | 379/67 |
| 5,003,584 | 3/1991 | Benyacar et al. | 379/119 |
| 5,155,761 | 10/1992 | Hammond | 379/67 |
| 5,185,782 | 2/1993 | Srinivasan | 379/67 |
| 5,483,582 | 1/1996 | Pugh et al. | 379/144 |
| 5,533,100 | 7/1996 | Bass et al. | 379/67 |
| 5,555,292 | 9/1996 | Eckhart | 379/67 |
| 5,625,682 | 4/1997 | Gray et al. | 379/266 |

*Primary Examiner*—Thomas W. Brown
*Attorney, Agent, or Firm*—Alfred G. Steinmetz

[57] ABSTRACT

A method and apparatus for allowing a caller to leave a message for an unreachable called party. The method and apparatus provides the caller with an option for a pre-paid return call that is billed to the caller. When the intended recipient of the call is unreachable, the call is transferred to a message server that gives the caller the option for a pre-paid return call for the recipient. The recipient is then notified of the available pre-paid return call through periodic callbacks to the intended recipient or by alerting the recipient the next time the recipient makes a call. The receiver of the message has the option of returning the call immediately or at a later time within a time duration set by the caller.

20 Claims, 3 Drawing Sheets

METHOD AND APPARATUS FOR A PRE-PAID RETURN CALL

FIELD OF THE INVENTION

The present invention relates to telecommunications and more specifically, to a method and apparatus for enabling a calling party to place a voice message for an unavailable called party with a pre-paid return call option which allows the unavailable party to return the call pre-paid to the calling party.

BACKGROUND OF THE INVENTION

Present well known telecommunication systems make it possible for a calling party to leave a message for an unavailable recipient. This is generally accomplished with some type of automated telephone answering device used by the intended recipient which enables the calling party to leave a recorded message. Additionally, presently available "1-800" lines or specialized subscriber services allow the calling party who maintains such a service, to offer the unavailable called party a return call to the calling party which is free of charge. In the case of the specialized subscriber service, the called party returns the call as a "collect call" under a "preferred" collecting calling party status. When such a call is made, the subscriber service typically employs some type of operator assistance which checks the calling party's originating phone, security access code, and other data to verify its status as a "preferred" collecting calling party.

Such current and other similar methods, require the calling party and the called party to both participate in a pre-determined subscriber service in order to reap the benefits of pre-paid telephone callback. Additionally, a subscriber's status is fixed and cannot be dynamically changed to allow pre-paid return calls on an ad-hoc basis. Thus, a subscriber wanting both non-pre-paid and pre-paid telephone callback, must purchase both a conventional line and a "1-800" line or pre-determining "preferred" collect callers service.

Therefore, a need exists for a simpler, ad-hoc method of returning a call free of charge without the undue inconvenience associated with operator assistance and/or 1-800 lines purchased for as few as only one intended user.

SUMMARY OF THE INVENTION

In accordance with the present invention, there is provided a method for automatically establishing a telecommunications connection between a calling party number and a recipient party number in a telephone network having a telecommunication switching system connected to a message server and a billing system connected to both the switching system and the message server. The method comprises the steps of providing for leaving a message with the message server; delivering the message to the recipient party number with the message server; and returning a call to the calling party number, wherein the return call is initiated by the recipient party number in response to the message.

The step of providing for leaving a message can include providing the calling party number with an option to pre-pay toll charges for the return call from the recipient party number, wherein the billing system charges the toll charges for the return call to the calling party number. The step of delivering the message can include calling the recipient party number, with the message server, up to a predetermined maximum number of times until the recipient answers one of the calls, each of the calls being made at predetermined time intervals. Both the maximum number of calls and the time intervals are selected by the calling party number.

Also in accordance with the present invention is a telecommunication system for automatically establishing a telecommunications connection between a calling party number and a recipient party number. The system comprises telecommunication switching means for connecting the calling party number to the recipient party number and message serving means, connected to the switching means, for recording a message placed by the calling party and delivering the message to the recipient party number, whereby the message causes the recipient party number to return a call to the calling party number.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

The present invention makes it possible for an originating caller to leave a recorded voice message for an unavailable called party and more importantly, provides the originating caller with a pre-paid return call option which bills the return call to the originating caller.

Figure 1:
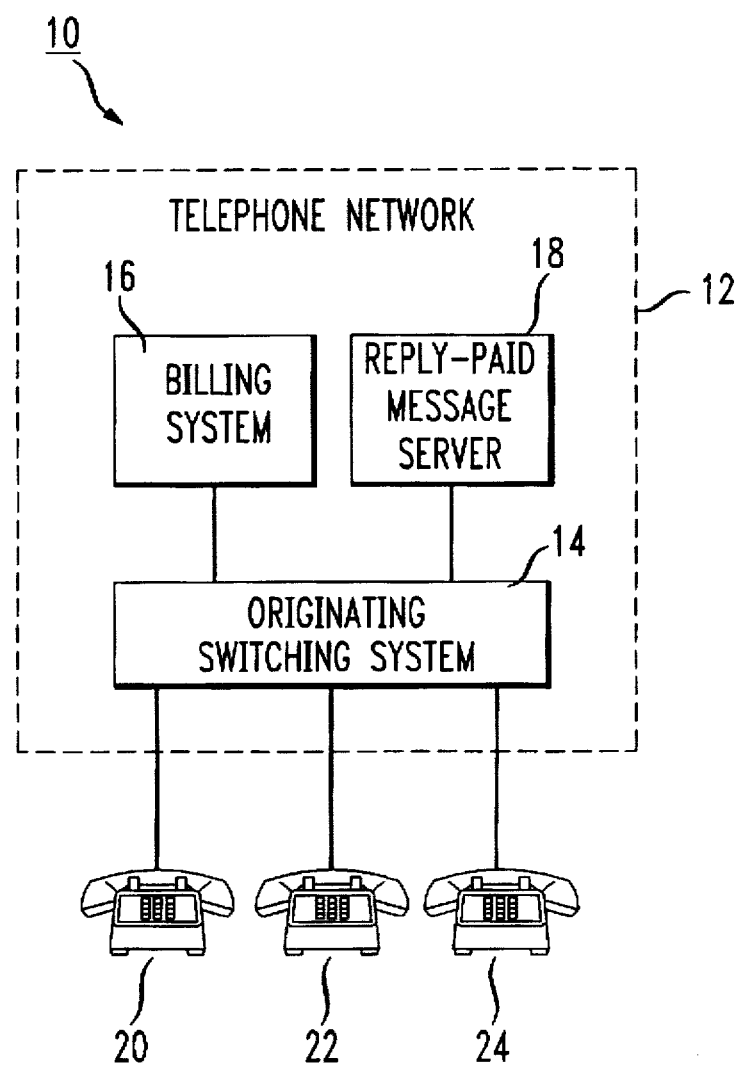
FIG. 1 is a block diagram depicting the system components of the present invention.

Referring to FIG. 1, a system layout 10 of the components used in the pre-paid return call option of the present invention is shown. The system 10 includes a telephone network 12 connecting a plurality of telephone sets 20, 22 and 24. Included in the telephone network 12 is a phone call originating switching system 14, which is connected to a reply paid message server 18 and a billing system 16. The message server 18 is triggered by the switching system 14 when an originating caller represented by telephone set 20, is unable to reach an intended recipient at the destination represented by telephone set 22.

The message server 18 used in the present invention enables the originating caller 20 to leave a recorded voice message for an unavailable called party and provides the caller 20 with a pre-paid return call option that bills the intended recipient's 22 return call to the originating caller 20, if desired. The billing system 16 which is also connected to the message server 18, operates in conjunction with the message server 18 to record the charges of any returned call established by the message server 18. The system 10 of the present invention is extremely flexible and will allow the intended recipient to return the pre-paid call at the location represented by telephone set 22 or any other different return call location as represented by telephone set 24.

Figure 2A:
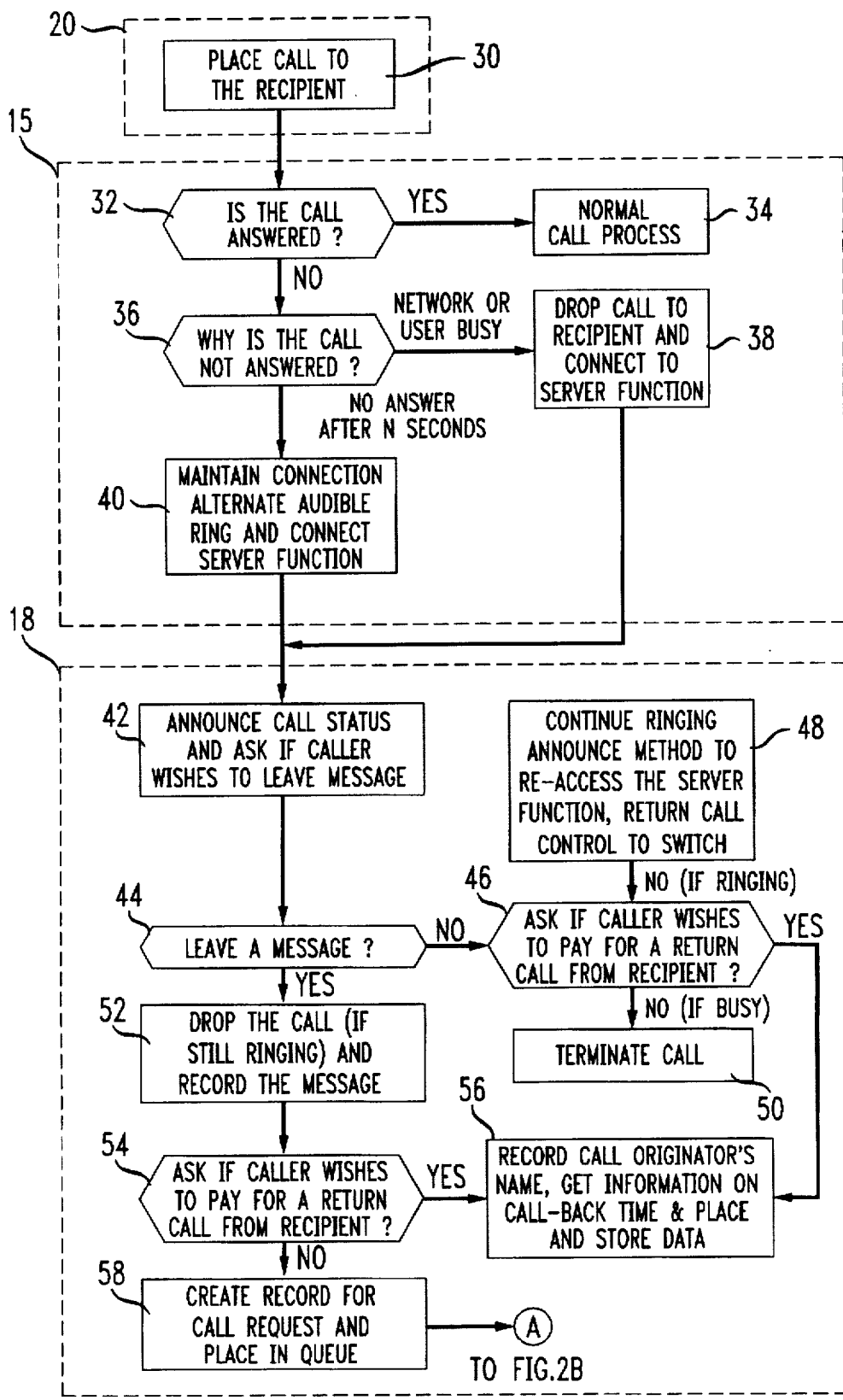
FIGS. 2A and 2B is a flowchart depicting a preferred illustrative embodiment of the method of the present invention.
Figure 2B:
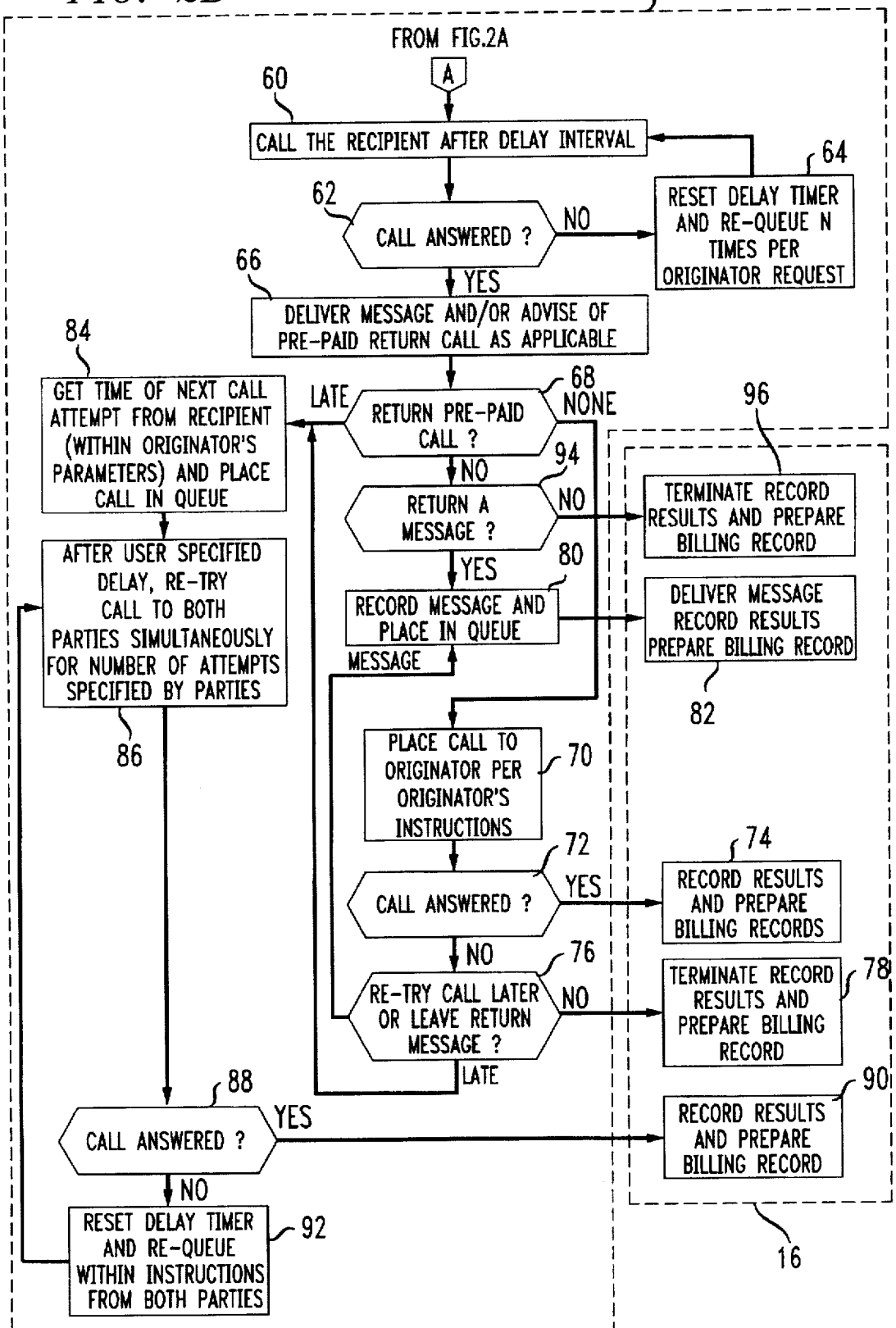

FIGS. 2A and 2B illustrate how the reply-paid return call method of the present invention is implemented on the system 10 described above. Referring first to FIG. 2A, the method of the present invention is initiated when the originating caller 20 places a call 30 to the recipient. In response to the placing of the call, the switching system 14 determines if the call is answered 32 by the recipient. If the call is answered, thereby establishing a telecommunications connection between the originating caller and the intended recipient, the message server 18 is not triggered and the switching system 14 processes the call normally 34. If, however, the call is not answered, the switching system then determines why the call is not answered 36. There are a number of conditions which will cause the originating caller 20 to be unable to reach the intended recipient 22. For example, if the network or the user is busy, the switching system 14 will drop the call and connect 38 to the message server 18. The message server 18 can also be triggered if the recipient does not answer after a predetermined number of seconds. Under these circumstances, the switching system 14 will maintain the connection, attenuate the audible ring (so that the message server 18 can be heard by the caller) and then connect 40 to the message server 18. It should be understood, that the trigger conditions presented herein are only for illustrative purposes and are not intended as the only conditions which will trigger message server 18 of the present invention.

In any case, if the intended recipient cannot be reached, the switching system 14 will connect to the message server 18. The message server 18 announces the status of the call 42 (recipient not available, etc.) and determines whether the originating caller 20 wishes to leave a recorded voice message 44 for the recipient. If the caller opts to leave a message, the message server 18 will record the originating caller's message 52 (and also drop the call if the message server 18 was connected as per the block 40). The message server 18 will then determine whether the caller would like the option of paying for a return call 54 from the recipient. If the caller elects to pay for a return call from the recipient, the caller can accomplish this by specifying this option using the keypad of the telephone set, by voice activation or by some other like method. When the pre-paid option is elected, the message server 18 will prompt the caller for further information 56 to accurately place and bill the return call from the recipient and to specify a given time duration allowed to the call. Such information can include the call originator's name, the call-back number for the originating caller, the number to call to deliver the message, the time and periodicity of calling the recipient to deliver the message, the maximum number of attempts to deliver the message, and the maximum time for allowing pre-paid call-back, etc. The message server 18 will record and store this data as per step 56. Next, the message server 18 will create a record of the call request and store it at the message server 18 as per the step 58. If the caller does not elect the pre-paid return call option at the step 54, the message server 18 will create a record of just the message and store it at the message server as per the step 58.

Returning to step 44, if the caller chooses not to leave a message, the message server 18 will then determine whether the caller wishes to pay for a return call 46 from the recipient. If the caller elects not to pay for the return call and the message server 18 was connected as per step 40 (no answer conditions), the message server 18 will continue ringing the recipient, announce a method for re-accessing the message server 18, and return control of the call 48 to the switching system 14. If the caller elects not to pay for the return call and the message server 18 was connected as per the step 38 (busy conditions), the message server 18 will terminate the call 50.

If on the other hand, the caller who wishes not to leave a message, elects to pay for the return call as per step 46, the message server 18 will record the call originator's name, get and store information on the call back time and place as per the step 56 and, record the call request as per the step 58.

Referring now to FIG. 2B, periodic attempts will be made after a caller specified delay interval, (as per the originating caller's instructions) to call the intended recipient and deliver the message and/or the notification that the return call is pre-paid. This is implemented by the message server 18 as depicted in steps 60, 62, and 64 up until the maximum number of attempts specified by the originating caller as per step 56. When the call is answered by the recipient, the message server 18 delivers the message and/or the notification that the return call is pre-paid 66 to the recipient. If a pre-paid return call option is available to the recipient, the message server 18 prompts the recipient 68 to elect or not elect a pre-paid return call. The recipient chooses the desired option by using the keypad of the telephone set, by voice activation or other like methods. If the recipient chooses not to return the pre-paid call, the message server then provides the recipient with an option to leave a message 94 for the originating caller. If the recipient opts for leaving a message, the message is recorded 80 and stored at the message server 18. Next, the message server 18 delivers the message and a billing record is subsequently prepared 82 by the billing system 16. If, however, the recipient opts not to leave a message, the message server 18 will terminate the call and record the results. A billing record of this call will then be subsequently prepared 96 by the billing system 16.

Returning to step 68, if the recipient chooses to return the pre-paid call, the recipient may return the call immediately as per the originator's instructions 70. In particular, the call will be immediately placed to the call-back number specified by the originating caller, thereby establishing a bridge telecommunication connection between the message server 18 and the recipient and, the message server 18 and the originating caller 20 if the call is answered 72. If the call is answered, a billing record is subsequently prepared 74 by the billing system 16. When the call is not answered, the message server will ask if the recipient wishes to re-try the return call later or leave a return message 76. If the recipient chooses neither of these two options, the message server 18 will terminate and record the results of the call and a billing record will be subsequently prepared 78 by the billing system 16. If the recipient chooses the leave return message option of step 76, the message server 18 will record the message 80 and store it at the message server 18. Next, the message server 18 will deliver the message to the originating caller and the billing system 16 will prepare a billing record 82.

If the recipient chooses the re-try the return call later option at step 76 or step 68, the message server 18 will ask the recipient for the time of the next call attempt (the time must be within the originating caller's parameters) and place the call in queue. After the recipient-specified delay, the message server 18 will re-try the call to both the originating caller and the recipient simultaneously 86. The message server will attempt the simultaneous re-try call up to the maximum number of times specified by both the recipient and the originating caller. The message server 18 must then determine if the call is answered 88. If the call is answered, the results of the call will be recorded and a billing record will be subsequently prepared 90 by the billing system 16. If the call is not answered, the message server will reset the delay time and re-queue within the instruction parameters of both the recipient and the originating caller.

As should now be apparent, the reply-paid method and apparatus of the present invention provides the called party or recipient with an easy and convenient method for replying to important messages without being billed for the reply call or for replying to messages at a more convenient later time in accord with the originating calling party's instructions. Further, the called party can easily return the call without operator assistance or a pre-determined subscriber status.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claims is reserved.

What is claimed is:

1. A method for automatically providing a telecommunications connection between a calling party and a recipient party in a telephone network having a telecommunication switching system connected to a message server and a billing system connected to both said switching system and said message server, said method comprising the steps of:

a) providing for leaving a message with said message server, wherein said message is generated by said calling party;
  b) delivering said message to said recipient party with said message server;
  c) providing for returning a call to said calling party, wherein said return call is initiated by said recipient party in response to said message, and providing the calling party an option to prepay the return call.

2. The method according to claim 1, wherein said step of providing for leaving a message includes providing said calling party with an option to pre-pay toll charges for said return call from said recipient party, wherein said billing system charges said toll charges for said return call to said calling party.

3. The method according to claim 1, wherein said step of delivering said message includes storing a predetermined maximum number of times said recipient party is to be called to deliver said message and a time interval to wait between making each of said calls, with said message server, said predetermined maximum number and said time interval being selected by said calling party.

4. The method according to claim 3, wherein said step of delivering said message further includes calling said recipient party, with said message server, up to said predetermined maximum number of times until said recipient answers one of said calls, each of said calls being made at said time intervals.

5. The method according to claim 1, wherein said step of providing for returning a call includes establishing a bridge telecommunication connection between a first telecommunication connection and a second telecommunication connection, said first telecommunication connection being between said message server and said recipient party and said second telecommunication connection being between said message server and said calling party.

6. The method according to claim 1, wherein said step of providing for leaving a message includes the steps of:

placing a call to said recipient party; and upon said call being unable to reach said recipient party;
  connecting said calling party to said message server with said switching system.

7. The method according to claim 1, wherein said step of delivering said message includes notifying said recipient party that a return call is pre-paid by said calling party.

8. A method for providing for pre-paying a telecommunications connection between a calling party and a recipient party in a telephone network having a telecommunication switching system connected to a message server and a billing system connected to both said switching system and said message server, said method comprising the steps of:

a) providing for leaving a message with said message server, wherein said message is generated by said calling party;
  b) delivering said message to said recipient party with said message server;
  c) providing for returning a call of a given time duration to said calling party, wherein said return call is initiated by said recipient party in response to said message;
  d) computing a cost of said return call using predetermined call rate data and said given time duration of said return call; and
  e) billing said cost of said return call to said calling party, wherein said computing and said billing steps are performed by said billing system.

9. The method according to claim 8, wherein said step of providing for leaving a message includes providing said calling party with an option to pre-pay toll charges for said return call from said recipient party.

10. The method according to claim 8, wherein said step of delivering said message includes storing a predetermined maximum number of times said recipient party is to be called to deliver said message and a time interval to wait between making each of said calls, with said message server, said predetermined maximum number and said time interval being selected by said calling party.

11. The method according to claim 10, wherein said step of delivering said message further includes calling said recipient party, with said message server, up to said predetermined maximum number of times until said recipient answers one of said calls, each of said calls being made at said time intervals.

12. The method according to claim 8, wherein said step of providing for returning a call includes establishing a bridge telecommunication connection between a first telecommunication connection and a second telecommunication connection, said first telecommunication connection being between said message server and said recipient party and said second telecommunication connection being between said message server and said calling party.

13. The method according to claim 8, wherein said step of providing for leaving a message includes the steps of:

placing a call to said recipient party; and upon said call being unable to reach said recipient party;
  connecting said calling party to said message server with said switching system.

14. The method according to claim 8, wherein said step of delivering said message includes notifying said recipient party that a return call is pre-paid by said calling party.

15. A telecommunication system for automatically providing a telecommunications connection between a calling party and a recipient party, comprising:

telecommunication switching means for connecting said calling party to said recipient party; and
  message serving means, connected to said switching means, for recording a message placed by said calling party, enabling the calling party to prepay a return call by the recipient party and delivering said message to said recipient party, whereby said message serving means allows said recipient party to return a call to said calling party number.

16. The system according to claim 15, wherein said message serving means provides said calling party with an option to pre-pay toll charges for said return call from said recipient party.

17. The system according to claim 15, further comprising billing means, connected to both said switching means and said message serving means, for computing a cost of said return call and billing said cost of said return call to said calling party.

18. The system according to claim 15, wherein said message serving means notifies said recipient party that said return call is pre-paid by said calling party.

19. The system according to claim 15, wherein said message server means stores data which is indicative of a predetermined maximum number of times said recipient party is to be called to deliver said message and a time interval to wait between making each of said calls, said predetermined maximum number and said time interval being selected by said calling party.

20. The system according to claim 19, wherein said message serving means calls said recipient party up to said predetermined maximum number of times until said recipient answers one of said calls, each of said calls being made at said time intervals.

* * * * *